United States Patent
Bogaert et al.

(10) Patent No.: US 6,245,838 B1
(45) Date of Patent: Jun. 12, 2001

(54) METHOD OF SUSPENSION POLYMERIZATION OF (METH)ACRYLIC MONOMERS USING DEXTRIN, AND POLYMER BEADS RESULTING FROM THAT METHOD

(75) Inventors: Yvan A. Bogaert, Ghent; Eric B. T. Moonen, Vosselaar; Robert R. L. Smolders, Antwepen; Francois C. D'Haese, Ghent, all of (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,112

(22) PCT Filed: Feb. 3, 1998

(86) PCT No.: PCT/US98/02024

§ 371 Date: Sep. 15, 1999

§ 102(e) Date: Sep. 15, 1999

(87) PCT Pub. No.: WO99/40134

PCT Pub. Date: Aug. 12, 1999

(51) Int. Cl.$^7$ .............................. C08F 2/20; C08F 20/10; C08L 3/02; C08L 33/04

(52) U.S. Cl. .............................. 524/48; 524/53; 524/457; 524/458; 524/459; 524/460; 524/560; 524/561; 524/832; 524/833; 428/407

(58) Field of Search .............................. 524/48, 560, 457, 524/458, 561, 562, 832, 833, 459, 460, 407, 53; 428/407

(56) References Cited

U.S. PATENT DOCUMENTS

| | | |
|---|---|---|
| 2,857,367 | 10/1958 | Kearney et al. . |
| 4,329,384 | 5/1982 | Vesley et al. . |
| 4,330,590 | 5/1982 | Vesley . |
| 4,560,724 | 12/1985 | Brabetz et al. . |
| 4,833,179 * | 5/1989 | Young et al. ......................... 522/183 |
| 4,929,317 | 5/1990 | Nishimura et al. . |
| 4,952,650 | 8/1990 | Young et al. . |
| 5,004,767 | 4/1991 | Krause et al. . |
| 5,004,768 | 4/1991 | Mahil et al. . |
| 5,292,844 | 3/1994 | Young et al. . |
| 5,380,779 | 1/1995 | D'Haese . |

FOREIGN PATENT DOCUMENTS

| | | |
|---|---|---|
| 0 334 515 A1 | 9/1989 | (EP) . |
| 0 351 193 B1 | 1/1996 | (EP) . |
| 0 853 092 A1 | 7/1998 | (EP) . |

OTHER PUBLICATIONS

C.E. Schildknect, Ed., Polmerization Processes, entitled, "Polymerization in Suspension", John Wiley & Sons, 1977, pp. 106–107.

Donatas Satas, Handbook of Pressure Sensitive Adhesive Technology, 2$^{nd}$ Ed., p. 402, Van Nostrand Reinhold, 1989.

* cited by examiner

Primary Examiner—David W. Wu
Assistant Examiner—Kelechi Egwim

(57) ABSTRACT

A method for aqueous bead-type suspension polymerization of (meth)acrylic monomers to prepare non-agglomerating, storage stable (meth)acrylic polymer beads which are extrudable at low temperatures. The invention also relates to the polymer beads and to their use as adhesive, in particular as a pressure sensitive adhesive. The invention also discloses adhesive compositions comprising the polymer beads.

13 Claims, No Drawings

METHOD OF SUSPENSION POLYMERIZATION OF (METH)ACRYLIC MONOMERS USING DEXTRIN, AND POLYMER BEADS RESULTING FROM THAT METHOD

The present invention relates to a novel method for aqueous bead-type suspension polymerization of (meth) acrylic monomers to prepare non-agglomerating, storage stable (meth)acrylic polymer beads which are extrudable at low temperatures. The invention also relates to the polymer beads which are obtainable by said method and to their use as adhesive and further to adhesive compositions comprising the polymer beads.

Known polymerization processes in heterogeneous aqueous dispersions comprise emulsion polymerization, dispersion polymerization, and bead-type suspension polymerization (see C. E. Schildknecht, Ed., *Polymerization Processes*, John Wiley & Sons, 1977, p. 106 and 107).

The polymers obtained via emulsion polymerization comprise fine particles of polymer stabilized by an emulsifier or surfactant and dispersed uniformly in the aqueous phase. The polymer product obtained is often referred to as a "latex", and the particle size is generally in the range of 0.05 to 0.2 $\mu$m. No beads are obtained during emulsion polymerization. The use of dextrin in emulsion polymerization methods in order to form adhesive compositions is known.

U.S. Pat. No. 5,004,768 discloses an adhesive composition comprising dextrin, a surfactant, and a polymer at least some of the repeating units of which are derived from an acrylate of at least one saturated aliphatic alcohol having from 4 to 12 carbon atoms. The manufacture of the composition may be carried out in any manner suitable for preparing acrylic polymers in the presence of a surfactant, emulsion polymerization being preferred.

EP-A-0 351 193 discloses a composition comprising dextrin, a surfactant, a polymer a major proportion of the repeating units of which are derivable from an acrylate of at least one saturated aliphatic alcohol having from two to twelve carbon atoms, and, optionally, a tackifier. If a tackifier is present, the dextrin level may be up to 7%, based on the total weight of dextrin, surfactant, and acrylate polymer. In the absence of tackifier, the maximum dextrin level is 3.5%. Preparation of the composition by emulsion polymerization is preferred.

Polymers obtained via dispersion polymerization are in the form of viscous, latex-like dispersions having a particle size in the range of 0.5 to 10 $\mu$m. The use of dextrin as a "protective colloid" in this type of polymerization is also known.

U.S. Pat. No. 5,004,767 teaches an aqueous acrylate polymer dispersion having a total solids content of 30 to 60% by weight, which has been made by polymerizing one or more acrylate monomers optionally together with other olefinically unsaturated monomer(s) in the presence of a dextrin, at least 70% of the dextrin having a molecular weight in the range of 1000 to 25000 and not more than 10% of the dextrin having a molecular weight above 25000.

U.S. Pat. No. 4,560,724 discloses a process for the preparation of aqueous polymer dispersions comprising polymerizing compounds with unsaturated ethylenic bonds at a temperature of 10 to 100° C. in the presence of an at least partially water-soluble free-radical initiator and at least one starch and/or starch derivative.

Bead-type suspension polymerization in general is a well known method of polymerization in which the polymer formed is obtained as spherical beads or pearls. Various different methods of avoiding agglomeration of the beads have been disclosed.

U.S. Pat. No. 4,833,179 and U.S. Pat. No. 4,952,650 teach a method for suspension polymerization of pressure-sensitive acrylate copolymer beads having a glass transition temperature of 0° C. or less. The copolymer beads are prepared by an aqueous suspension polymerization technique utilizing a modifier moiety selected from polystyryl macromers, reactive zinc salts, and hydrophobic silica. The modifier moiety is used in an amount sufficient to render the copolymer beads non-agglomerating at room temperature for handling and transportation purposes. According to U.S. Pat. No. 5,292,844, although the beads disclosed in U.S. Pat. No. 4,833,179 and U.S. Pat. No. 4,952,650 are easily transportable, they are not easily extrudable at low temperatures and must be extruded at 171° C. to 194° C., which is disadvantageous because polymers are more susceptible to decomposition at such high temperatures. In order to overcome the extrusion problem, U.S. Pat. No. 5,292,844 teaches the use of vinyl acetate as a comonomer in the suspension polymerization of pressure-sensitive adhesives (PSAs), in combination with a modifier moiety. The non-agglomerating, storage stable acrylate copolymer PSA beads thus obtained can be extruded below 170° C.

According to U.S. Pat. No. 5,292,844, the concept of inherent viscosity is important to the understanding of both extrudability and storage stability of suspension polymer beads. A low viscosity polymer is easier to coat due to its low internal resistance. However, a bead comprising a low viscosity polymer is more likely to clump during storage, due to its softness. This can cause problems during transportation and subsequent use since the beads will not easily pour when clumped together. Suspension beads comprising high viscosity polymers are less likely to be sticky and clump together. Thus, they have better storability. However, high viscosity polymers, due to their high internal resistance and lack of flow, are difficult to pass through an extrusion coater unless high temperatures are employed. Beads formed without vinyl acetate which are storage stable must have an inherent viscosity that is so high (e.g., 1.1) that they can only be extruded at high temperatures. Suspension beads which do not contain vinyl acetate can be prepared which are extrudable at low temperatures but which are not storage stable (IV 0.7 dl/g) (see U.S. Pat. No. 5,292,844, column 11, lines 26–35).

The adhesives formed from the beads comprising vinyl acetate as taught in U.S. Pat. No. 5,292,844 typically have inherent viscosities of about 0.6 to about 1.5 dl/g in ethyl acetate, preferably about 0.65 to about 0.8 dl/g in order to facilitate extrusion at low temperatures (below about 170° C.).

Using vinyl acetate as comonomer results in more easily extrudable beads but will also modify the adhesive properties, as is known in the art of solution and emulsion polymerization (see, e.g., Donatas Satas, *Handbook of Pressure Sensitive Adhesive Technology*, 2nd Ed., p. 402, Van Nostrand Reinhold, 1989). Furthermore, the adhesives are limited in inherent viscosity.

It is an object of the present invention to provide a method of suspension polymerization of (meth)acrylic monomers for making storage stable, low temperature extrudable suspension polymer beads that does not require the presence of a modifier moiety. It is a further object of the present invention to provide a method as defined above that does not require the presence of a specific monomer such as vinyl acetate. It is a further object of the present invention to provide storage stable, low temperature extrudable suspension polymer beads of a (meth)acrylic polymer having a broad range of inherent viscosities.

It has been discovered that these objects can surprisingly be achieved through the use of a dextrin or of a derivate thereof as a stabilizer in the suspension polymerization of (meth)acrylic monomers.

Briefly, in one aspect, this invention provides a method of suspension polymerization of (meth)acrylic monomers wherein a monomer premix comprising (i) at least one (meth)acrylic acid ester of at least one nontertiary alkyl alcohol, the alcohol having from 1 to 18 carbon atoms; and (ii) at least one free-radical initiator is polymerized in an aqueous medium in the presence of at least one stabilizer selected from dextrins and dextrin derivatives and said monomer premix further comprising at least one polar monomer or polar macromer copolymerizable with the (meth)acrylic acid ester and/or said aqueous medium further comprising a water soluble or water dispersible polymeric costabiliser.

In addition, the monomer premix may further comprise other monomers and/or additives such as chain transfer agents, water soluble inhibitors, and crosslinking agents.

In another aspect, this invention also provides the use of a dextrin or a derivative thereof as stabilizer in the suspension polymerization of (meth)acrylic monomers.

And, in yet another aspect, this invention provides polymer beads comprising a (meth)acrylic polymer of (i) at least one (meth)acrylic acid ester of at least one nontertiary alkyl alcohol, the alcohol having from 1 to 18 carbon atoms;

said polymer beads having on their surface a layer comprising at least one stabilizer selected from dextrins and dextrin derivatives and optionally a water soluble or water dispersible polymeric costabiliser. Particularly preferred are polymer beads wherein the (meth)acrylic polymer is a copolymer of (i) at least one (meth)acrylic acid ester of at least one nontertiary alkyl alcohol, the alcohol having from 1 to 18 carbon atoms; and (ii) at least one polar monomer or polar macromer copolymerizable with the (meth)acrylic acid ester. The polymer beads exhibit a broad range of inherent viscosities and exhibit both good storage stability, in particular in a wet state at room temperature (20–30° C.), and low temperature extrudability.

By the term "polymer beads" in connection with the present invention is meant polymer particles that are simple to isolate e.g. by filtering or centrifuging. The polymer beads in connection with the present invention, typically have a diameter of at least 50 μm, preferably at least 100 μm. Generally, the beads have a diameter between 150 and 5000 μm.

In a further aspect, this invention also provides the use of said polymer beads as an adhesive, in particular as a pressure sensitive adhesive.

This invention also provides an adhesive composition comprising polymer beads as defined above and further, a coated material comprising on a substrate the adhesive composition. Preferably, the adhesive composition is a pressure sensitive adhesive composition.

Dextrins and their derivatives useful in the present invention to stabilize the bead-type suspension polymerization can be used as the only stabilizer and can be linear or cyclic. Dextrins are the degradation products of starches of different origin (e.g., potatoes and corn) obtained by dry thermal treatment in the presence or absence of a certain amount of acid or other chemical reagent or of an enzyme (see, e.g., ISO NORM 1227–1979).

Linear dextrins are commonly classified in white, yellow, and pyro dextrins. The linear dextrins used in the present invention are preferably not completely water soluble at room temperature.

Cyclic dextrins are cyclic torusshaped oligosaccharides which are formed by the decomposition of starch by a bacterial enzyme called cyclodextrin glycosyltransferase.

Maltodextrins are low molecular weight dextrin derivatives.

Representative examples of dextrins and dextrin derivatives useful in this invention include linear dextrins such as Tackidex® grades available from Roquette, France, Dextrin available from Aldrich, Belgium; cyclic dextrins) such as ALPHA W6, BETA W7 and GAMMA W8, from Wacker-Chemie GmbH, Germany and Maltodextrins such as Glucidex® grades from Roquette.

Preferred dextrins and dextrin derivatives include linear dextrins, such as Tackidex® 035, Tackidex® 133, Tackidex® 050 and Tackidex® M332F and cyclic dextrins, such as ALPHA W6 and BETA W7. Preferably, the dextrins yield hazy solutions when dissolved at 22° C. rather than clear solutions.

The compositions according to the invention generally contain about 0.1 to about 10% by weight of dextrin based on the total amount of monomers and macromers. Preferably about 0.3% to about 2% by weight of dextrin is used.

The (meth)acrylic acid ester monomers useful in the present invention include monofunctional ethylenically unsaturated esters of (meth)acrylic acid and/or substituted (meth)acrylic acid and alcohols comprising about 1 to about 18 carbon atoms, preferably about 1 to about 12 carbon atoms. The alcohols are advantageously straight or branched chain aliphatic alcohols, are preferably monohydroxy alcohols and preferably free from other functional substituent groups. Useful monomers include but are not limited to those selected from methyl (meth)acrylate, n-butyl (meth)acrylate, ethyl (meth)acrylate, 2-methylbutyl (meth)acrylate, isooctyl (meth)acrylate, 2-ethylhexyl (meth)acrylate, isononyl (meth)acrylate, decyl (meth)acrylate, dodecyl (meth)acrylate, hexyl (meth)acrylate, isobornyl (meth)acrylate, octadecyl (meth)acrylate, phenoxyethyl (meth)acrylate, alkoxylated alkyl(meth)acrylates such as e.g. ethoxyethoxyethyl(meth)acrylate, ethoxyethyl(meth)acrylate, methoxyethyl(meth)acrylate, methoxyethoxyethyl (meth)acrylate etc., and mixtures thereof. In case polymer beads that contain alkoxylated alkyl(meth)acrylates such as ethoxyethoxyethyl(meth)acrylate as a comonomer, it may be desirable to add a small amount of sodium styrene sulfonate to obtain stable beads.

Preferred (meth)acrylic acid ester monomers include those selected from methyl (meth)acrylate, butyl (meth)acrylate e.g. n-butyl (meth)acrylate, ethyl (meth)acrylate, 2-methylbutyl (meth)acrylate, isooctyl (meth)acrylate, 2-ethylhexyl (meth)acrylate, isononyl (meth)acrylate, decyl (meth)acrylate, dodecyl (meth)acrylate, hexyl (meth)acrylate, isobornyl (meth)acrylate, octadecyl (meth)acrylate, phenoxyethyl (meth)acrylate, and mixtures thereof.

Preferably, the polymer beads of the present invention are copolymers of (meth)acrylic acid esters and optionally one or more additional monomers. (Meth)acrylic acid ester monomers generally comprise from about 60 to about 100 parts by weight based on 100 parts total monomer content, preferably from about 70 parts to about 98 parts based on 100 parts total monomer content.

Copolymerizable polar monomers can be selected from both strongly and moderately polar copolymerizable monomers. The polar monomers preferably have one or more hydrophilic groups such as hydroxy, thiol, amino, amid, ionic groups such as an acid, e.g. carboxylic acid, sulphonic acid, phosphonic acid, phosphoric acid and salts thereof, an ammonium group etc . . . , or one or more polar groups such as a nitrile. Examples of polar monomers are methacrylic acid, acrylic acid, itaconic acid, hydroxyalkyl (meth) acrylates, β-carboxy ethyl (meth)acrylate, styrene sulfonic acid or the sodium salt thereof, maleic acid, fumaric acid, (meth)acrylamides and substituted (meth)acrylamides, N-vinylpyrrolidone, N-vinyl caprolactam, acrylonitrile, dimethyl amino propyl methacrylate. Preferred polar monomers include acrylic acid, methacrylic acid, (meth) acrylamide and substituted (meth)acrylamide. Polar monomers generally are comprised from about 1 to about 40 parts by weight based on the total monomer content, preferably from about 2 to about 30 parts by weight.

Copolymerizable polar macromers are preferably water soluble or water dispersible polymers or oligomers that contain a polymerizable group. A macromer useful in preparing copolymer beads contains a single polymerizable group such as a vinyl group.

Typically, the polar macromer contains a plurality of hydrophilic sites which impart the required hydrophilicity of the macromer to make it water soluble or water dispersible. A polar macromer in connection with this invention may be represented by the general formula I

X—Y—Z wherein X is a structural element comprising a moiety copolymerizable with the (methacrylic acid ester, Y is a divalent linking group, and Z is the hydrophilic site and comprises a water-dispersible or water soluble polymeric or oligomeric moiety, i.e. one containing two or more monomer units which are essentially unreactive under free radical initiated copolymerizing conditions employed to form the copolymer beads.

A preferred X group of the polar macromer is a vinyl group of the general formula II

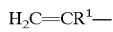

$H_2C=CR^1—$ wherein $R^1$ is a hydrogen atom or a methyl group.

A preferred Y group is a divalent carbonyl group.

A preferred Z moiety is an oligomeric/polymeric material with a molecular weight of 300 to 30,000 g/mol. Preferably, the Z moiety is a polyethyloxazoline or a poly-N-vinylpyrrolidone or a polyalkyleneoxide structure. It is also possible to use a Z component which is a copolymer of different monomers, e.g. a copolymer of one or more of the above listed polar monomers such as a copolymer of a N-vinylpyrrolidone and acrylamide.

A number of macromers of the type useful for the invention are available commercially. One method of preparing macromers uses commercially available preformed polymeric Z moieties and conventional chemical reactions for modifying them. For example, a monomethoxypolyethyleneglycolacrylate macromer can be prepared by esterification of a monohydroxyl-terminated poly($C_1$–$C_5$ alkylene oxide) compound in an appropriate solvent. To the solution is added α, β-unsaturated carboxylic acid, preferably in presence of p-toluene sulfonic acid and refluxed for generally 16 to 18 hours. Excess acid is neutralized and the precipitate is filtered off. Suitable monohydroxyl terminated poly($C_1$–$C_5$ alkylene oxides) which may be used to prepare the macromers using the above described procedure include Carbowax™ 750, Carbowax™ 550 and Carbowax™ 350.

The macromer can also be prepared by an addition reaction in which an isocyanate is reacted with a monohydroxyl or monoamine terminated poly($C_1$–$C_5$ alkylene oxides) as well as other Z moieties as described above. For example a benzylisocyanate having a vinylic double bond in the side chain may be reacted with a monoamine terminated poly($C_1$–$C_5$ alkylene oxide). The components are mixed and reacted for a few hours for quantitative conversion. A suitable monoamino terminated poly($C_1$–$C_5$ alkylene oxide) is for example Jeffamine™ M 600.

The macromers can be also prepared by first synthesizing a suitable Z moiety and then converting it to a macromer using known methods. For example, the Z moiety may be formed by radical polymerization of N-vinylpyrrolidone and acrylamide in the presence of a chain transfer agent for example amino-ethanethiol, using a radical chain initiator for example azobisisobutyronitrile in an appropriate organic solvent. Then, in a second step, the X and Y moiety containing compound is reacted with the Z-moiety which bears primary amine groups as a result of the chain transfer reaction. A suitable reagent for introducing the X and Y groups is vinyl azlactone (available from SNPE, France). The vinyl-azlactone ring can be opened yielding the macromer.

Optionally, also other, not necessarily polar, comonomers or comacromers can be used together with the (meth)acrylic acid esters and/or the polar comonomers or polar macromers. Examples include monomers selected from styrene, alpha-methyl styrene, vinyl acetate, and vinyl ester monomers such as vinyl 2-ethyl hexanoate and derivatives thereof, and comacromers such as a polystyrene macromer, a polymethylmethacrylate macromer or a polyphenyleneoxide macromer etc. . . . Such optional comonomers/comacromers can generally be used in a range up to about 40 parts by weight based on the total monomer and/or macromer content.

In case the monomer premix does not comprise a polar monomer or a polar macromer a water soluble or water dispersible polymeric costabiliser is needed to obtain stable beads. In case the monomer premix includes a polar monomer or a polar macromer, the costabiliser is an optional component. The costabiliser is preferably a synthetic water soluble or water dispersible polymer such as e.g. a polyvinylalcohol, a polyvinylacetate, a poly-N-vinylpyrrolidone, a poly(meth)acrylic acid etc . . . or mixtures thereof. The costabiliser can be used in an amount of 0.1% by weight to 10% by weight, preferably 0.3% to 2% by weight based on the total weight of monomers and/or macromers.

Initiators for polymerizing the monomers to provide the polymer beads of the invention are those which are normally suitable for free-radical polymerization of acrylate monomers and which are oil-soluble and have low solubility in water, e.g. organic peroxides such as benzoyl peroxide and lauryl peroxide. Preferred initiators are azo-initiators and include 2,2'-azobisisobutyronitrile, commercially available from E.I. Dupont de Nemours as Vazo™ 64 and 2,2'-azobis (2,4-dimethyl valeronitrile), available from Wako as V-65. The initiator can generally be present in an amount of from about 0.01 to 1 parts by weight based on 100 parts of monomer content.

Useful chain transfer agents include mercaptans, alcohols, carbon tetrabromide, and mixtures thereof. Isooctyl thioglycolate and carbon tetrabromide are preferred. When used, the chain transfer agent can generally be present in an amount of from about 0.01 to about 0.5 parts by weight preferably from about 0.01 to about 0.2 parts, based on 100 parts total monomer content.

Optionally, a water soluble inhibitor can be added to inhibit polymerization in the water phase in order to prevent the formation of too much polymer by emulsion and/or solution polymerization in the water phase, which can result in bead agglomeration or emulsion type polymerization. Suitable inhibitors include those selected from thiosulfates, thiocyanates and nitrites. When used, the water soluble inhibitor can generally be added in an amount of from about 0.01 to about 1 parts by weight based on 100 parts total monomer content.

Crosslinking agents can also be used in the present invention. Preferred crosslinking agents include copolymerizable aromatic ketone monomers, especially acryloxybenzophenone and derivatives, triazine crosslinking agents such as those taught in U.S. Pat. No. 4,330,590 (Vesley) and U.S. Pat. No. 4,329,384 (Vesley et al.), and combinations thereof When present, the crosslinking agent generally comprises from about 0.01 to about 5 parts weight based on 100 parts total monomer content.

Other additives can optionally be used in combination with dextrins, e.g., borax, urea, glyoxal and urea formaldehyde resin. Biocides (both bactericides and fungicides) can also be added, in order to prevent microbial growth in the finished product and during its use.

The monomers, free-radical initiator, and any optional materials can be mixed together in the prescribed ratio to form a premix. Dextrin or a derivative of dextrin can be combined with water and then with the premix to form an oil in water suspension. The resulting suspension typically comprises from about 10 to about 50 weight percent monomer premix and from about 90 to about 50 weight percent water phase. Bead-type suspension polymerization in accordance with the present invention is typically a thermally initiated polymerization and is preferably carried out with agitation for about 2 to about 16 hours at a temperature between about 40° C. and 90° C. The polymers made by the method of the present invention are preferably soluble in ethyl acetate and typically have an inherent viscosity between about 0.4 and 2.2 dl/g, (measured in ethyl acetate). The inherent viscosity of the polymers can be varied according to particular needs, e.g., by changing the amount of chain transfer agent utilized.

The polymer beads prepared by the method of the present invention are useful in any application in which acrylate adhesives and adhesive formulations, in particular pressure sensitive adhesive compositions, otherwise produced may be used. In order to make .adhesive composition, the polymer beads can be extruded at temperatures below 180° C. Alternatively, the polymer beads can be coated from water or solvents by conventional methods such as roller coating or dip coating. Extrusion or coating results in the formation of a continuous film of adhesive. These adhesive compositions can be applied to a backing, e.g., polyethylene terephthalate (PET) liner, or to a release liner such as a silicone-coated paper to form a tape or a transfer tape.

Tacky bead-type suspension polymers that can be obtained in connection with the present invention can optionally be compounded with tackifying agents in order to improve tack and adhesive strength. Useful tackifying agents include rosin and rosin derivatives, hydrocarbon tackifiers such as polyterpenes, synthetic hydrocarbon resins, and modified phenolic resins. Preferred tackifiers include hydrocarbon resins, such as Regalrez® and Regalite® (Hercules); phenol terpene tackifiers, such as SP 553 and SP 560 (Schenectady), Dertophene T resins (DRT), ARKON® and Tamanol resins (Arakawa Chemical Industries), Nirez 2019 and Nirez 2040V (Reichhold); rosin and rosin derivatives, such as Foral® (Hercules) and Uni-Tac® (Union Camp); glycerol-modified rosin esters, such as Foral® 85 (Hercules); mixtures thereof; and the like. Generally, the tackifying agent comprises about 0 to about 60 parts by weight, preferably about 10 to about 55 parts by weight, most preferably about 15 to 50 parts by weight based on 100 parts by weight of suspension polymer beads.

Further optional components that can be added to the compositions of the present invention include additives such as pigments, dyes, viscosity builders, viscosity stabilizers, antioxidants, matting agents, inert fillers and waxes.

Test Methods

The test methods used for determining peel adhesion and shear of adhesive formulations made from the polymer beads prepared according to the method of the present invention are based on those described by the Pressure-Sensitive Tape Council (Test Methods for Pressure-Sensitive Tapes, Ninth Edition, August 1989), with some deviations as outlined below.

Peel Adhesion

This test follows the guidelines of the Pressure-Sensitive Tape Council Method PSTC-3. Peel adhesion is the force required to remove a coated flexible sheet material from a test panel measured at a specific angle and rate of removal. In the following Examples, this force is expressed in Newtons per decimeter width (N/dm) of coated sheet.

In testing peel adhesion, 12.5 mm width of the coated sheet is applied to the horizontal surface of a clean test plate with at least 12.7 lineal cm in firm contact. A hard rubber roller is used to apply the strip. The free end of the coated strip is doubled back, and the free end is attached to the adhesion tester scale. The angle of removal is 90° or 180°, as indicated in the experiments. The test plate is clamped in the jaws of the tensile testing machine which is capable of moving the plate away from the scale at a constant rate of 300 mm/min. The scale rating in Newtons is recorded as the tape is peeled from the surface. The data are recorded as the average value of the range of numbers observed during the test.

Shear Holding Strength

This test follows the procedure described in PSTC-7. Shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of the time (in minutes) required to pull a standard area of adhesive coated sheet material from a stainless steel test panel under stress of a constant standard load. The tests are conducted on adhesive coated strips applied to a stainless steel panel such that a 25 mm by 12.5 mm portion of each strip is in firm contact with the panel, with one end portion of the tape being free. The panel with coated strip attached is held in a rack such that the panel forms an angle of 178° with the extended tape free end which is then tensioned by application of a force of one kilogram (test at room temperature) or 0.5 kilogram (test at 70° C.) applied as a hanging weight from the free end of the coated strip. An angle of 178° is used to negate any peel forces, thus ensuring that only the shear forces are measured in an attempt to more accurately determine the holding power of the tape being tested. The time (min) elapsed for each tape example to separate from the test panel is recorded as the shear strength.

Inherent Viscosity (IV)

The inherent viscosity of the polymers was measured by conventional means using a Cannon-Fenske # 50 viscosimeter in a water bath controlled at 25° C. to measure the flow time of 10 ml of a polymer solution (0.15 g of polymer in 100 ml ethyl acetate). Inherent viscosity is recorded as dl/g.

Abbreviations

The following abbreviations are used:

IOA: isooctyl acrylate
MAA: methacrylic acid
AA: acrylic acid
BA: butylacrylate
BCEA: Beta carboxyethyl acrylate
(EO)2EA ethoxyethoxyethyl acrylate
FUSOAM90g: polyalkylene oxide containing acrylate macromer obtained from Shinnakamura
FUSOM90g: polyalkylene oxide containing methacrylate macromer obtained from Shinnakamura
CW750AM: mono-methoxypolyethyleneglycol acrylate prepared from Carbowax™ 750 (Union Carbide) in accordance with the procedure set out at column 10 of U.S. Pat. No. 5,380,779
STS: sodium thiosulfate, available from Caldic C-Goldschmidt
SSS: sodium salt of styrene sulphonate
IOTG: isooctylthioglycolate, available from Elf Atochem
Ex.: example
RT: room temperature
ABP: acryloxybenzophenone
FPM: feet per minute
WPI: Watts per inch
rpm: rotations per minute
IBA: isobornyl acrylate
N,N-DMAcAM: N,N-dimethylacrylamide
2-EHA: 2-ethylhexylacrylate
SS: stainless steel
Mel: melamine plate
PVP: poly N-vinylpyrrolidone PVP™ K-90 available from GAF
PAA: polyacrylic acid
PVA: polyvinylalcohol (88% hydrolysed) obtained from Janssen Chimica
PETP: pentaerythritol tetrakis mercaptopropionate (obtained from Aldrich)

EXAMPLES

The following examples are intended to be illustrative and should not be construed as limiting the invention in any way. All parts, ratios, and percentages are by weight unless otherwise noted.

General Procedure for the Suspension Bead-type Polymerization

Suspension polymer beads were made using the general method as described below: the reaction was carried out in a two liter flask equipped with a condenser, nitrogen inlet, thermowell, stainless steel motor-driven stirrer, and a heating unit with temperature control The reaction flask was charged with deionized water and an amount of dextrin or a derivative of dextrin, as indicated in the specific examples. The resulting mixture was heated to 45° C. with agitation while purging with nitrogen. Then a premixed charge of monomers, initiator, and optional chain transfer agent, water soluble inhibitor and photocrosslinker was added while stirring vigorously at a rate between about 600 and 750 rpm. The temperature of the reaction mixture was adjusted to 45° C. or 55° C. (depending on the initiator). Reaction was continued with nitrogen purging until completion. The copolymer beads thus formed may be coated from water. Alternatively, they could be collected by filtration and dried in an air ventilated oven, after which they could be coated via extrusion or could be dissolved in solvent and coated as a solution in a solvent.

General Procedure for Preparing an Adhesive Layer by Extrusion of the Suspension Polymer Beads After dewatering to about 5–10% residual water, the polymer beads were extruded at a temperature below 180° C. The samples could be formulated with tackifying agent, which was added to the molten extruder contents An adhesive layer was formed onto a backing. If the adhesive composition was to be used as a tape, it was coated onto a flexible carrier web; if it was to be used as a transfer tape, it was applied to a release liner such as a silicone-coated paper. In order to obtain a double coated tape construction, the adhesive coatings were laminated against both sides of a flexible carrier, such as, e.g., a flexible polyvinyl chloride (PVC) or polypropylene carrier.

When a photocrosslinker was used, the samples were crosslinked or cured using UV-cure lamps (e.g., AUV 6A/300WPI, available from American Ultraviolet Company, USA; or F-600 D-bulb, available from Fusion GmbH Germany) to obtain the desired balance of adhesive/cohesive properties, Examples 1 to 4 and Comparative Examples C-1 and C-2

Examples 1 to 4 were made essentially according to the above-described general procedure for the bead-type suspension polymerization with a premixed charge of 96% IOA and 4% MAA, along with the amounts of IOTG and sodium thiosulfate shown in Table 1, and 0.3% V-65 initiator. Dextrin (available from Aldrich, Belgium) was used as the suspension stabilizer. The initiation temperature was 45° C. Stable beads were made.

Comparative Examples C-1 and C-2 were made in the same way, but with conventional suspending agents such as hydroxyethylcellulose (Natrosol® 250 MBR, available from AQUALON, Germany) in C-1 and hydroxypropylcellulose (Klucel L®, available from AQUALON, Germany) in C-2, instead of using dextrin.

TABLE 1

Bead-type Suspension Polymerization, Stabilized with Dextrin

| Ex. No. | Stabilizer | Weight % | Weight % | Weight % | Result |
|---|---|---|---|---|---|
| 1 | dextrin | 0.6 | 0.1 | 0.16 | Free flowing beads* |
| 2 | dextrin | 0.6 | 0.16 | 0.16 | Free flowing beads* |
| 3 | dextrin | 0.4 | 0.16 | 0.16 | Free flowing bead* |
| 4 | dextrin | 0.6 | 0.16 | 0.1 | Free flowing beads* |
| C-1 | Natrosol ®250 MBR | 0.6 | 0.16 | 0.1 | no beads formed |
| C-2 | Klucel L ® | 0.6 | 0.1 | 0.1 | Coagulation |

Note: Example 4 also contains 0.3% ABP
*in wet state

Although conventional suspension stabilizers such as hydroxyethylcellulose or hydroxypropylcellulose can be used in a bead-type suspension polymerization using a modifier moiety, as taught in U.S. Pat. No. 4,833,179, U.S. Pat. No. 4,952,650, and U.S. Pat. No. 5,292,844, such stabilizers cannot be used in the absence of a modifier moiety. Surprisingly, the use of dextrin as the stabilizer for suspension polymerization did not require the presence of a modifier moiety. Free flowing beads were obtained that were stable for more than 4 weeks.

Examples 5 to 11

Examples 5 to 11 were made in order to evaluate dextrins from different sources (available from Roquette, France, as different Tackidex® grades) and having different solubilities in water (at 22° C.). The polymerization reactions were carried out essentially according to the general method described above. The premixed monomer charge contained 96% IOA, 4% MAA, 0.16% IOTG, 016% STS, and 0.3% V-65. In all examples, 0.6% dextrin was used. The initiation temperature was 45° C. The reactions were continued with nitrogen purge until completion. Stable suspension beads were obtained as indicated in Table 2.

TABLE 2

Evaluation of Tackidex ® Dextrins in Bead-type Suspension Polymerization

| Ex. No. | Tackidex ® Grade | Source | % Insolubles in Water (22° C.) | Nature of Beads* |
|---|---|---|---|---|
| 5 | G 170 | Potatoes | 0.1 | free flow |
| 6 | DF 165 | Potatoes | 0.25 | free flow |
| 7 | DF 155 | Potatoes | 0.5 | free flow |
| 8 | G 155 | Potatoes | 2 | free flow |
| 9 | 050 | Corn | 40–60 | free flow |
| 10 | 035 | Corn | 50–75 | free flow |
| 11 | 133 | Potatoes | 80–90 | free flow |

Note: *in wet state

The results indicate that stable suspension beads were made in the presence of dextrins of different sources and various solubilities in water.

Examples 12 to 20

In Examples 12 to 20, suspension polymer beads were prepared of IOA/MAA 96/4 essentially according to the above-described general procedure, using 0.6% Tackidex® 035 as the stabilizer. The amount of chain transfer agent was varied in order to make various polymers beads with different inherent viscosities. The compositions and inherent viscosities (IV) of the samples are given in Table 3.

TABLE 3

Compositions and IV of Suspension Polymer Beads Prepared with Tackidex ® 035 Dextrin as Stabilizer

| Ex. No. | % IOTG | % ABP | % STS | IV |
|---|---|---|---|---|
| 12 | 0.011 | 0 | 0.2 | 2.02 |
| 13 | 0.014 | 0 | 0.2 | 1.43 |
| 14 | 0.014 | 0.2 | 0.2 | 1.5 |
| 15 | 0.03 | 0 | 0.2 | 1.13 |
| 16 | 0.03 | 0.2 | 0.2 | 1.15 |
| 17 | 0.045 | 0.1 | 0.15 | 0.92 |
| 18 | 0.07 | 0.1 | 0.2 | 0.63 |
| 19 | 0.16 | 0.05 | 0.2 | 0.4 |
| 20 | 0.16 | 0.3 | 0.15 | 0.41 |

In all cases, suspension polymer beads were formed that were non-agglomerating and stable for more than 4 weeks. Surprisingly, even the polymer beads with very low IV (0.4) were stable and non-agglomerating.

Examples 21 to 24

Examples 21 to 24 were made in order to evaluate derivatives of dextrins such as maltodextrin (available as Glucidex® grades from Roquette, France) and beta-cyclo dextrin (available from Wacker Chemie, Germany). The dextrin derivatives were evaluated in the suspension polymerization of IOA/MAA 98/2, essentially according to the above-described general procedure (with addition of 0.2% STS, 0.3% V-65, and 0.017% IOTG). 0.6% dextrin derivative was used. The results are given in Table 4.

TABLE 4

Bead-type Suspension Polymerization with Derivatives of Dextrin

| Ex. No. | IOA/MAA Ratio | Stabilizer | Nature of Beads* |
|---|---|---|---|
| 21 | 98/2 | Glucidex 6 ® | Free flow |
| 22 | 98/2 | Glucidex 12 ® | Free flow |
| 23 | 98/2 | Glucidex 19 ® | Free flow |
| 24 | 98/2 | Beta-cyclodextrin | Free flow |

*in wet state

The results indicate that derivatives of dextrin can also be used as the stabilizer in the bead-type suspension polymerization of(meth)acrylic monomers.

Examples 25 to 33

Examples 25 to 33 were made to evaluate the influence of different monomers on the ability to make free flowing polymer beads through bead-type suspension polymerization using dextrin as stabilizer. Suspension polymers were made from the monomers indicated in Table 5, essentially according to the general method described above. 0.3% V-65, and the amounts of IOTG, STS, and ABP indicated in Table 5 were used. Examples 25 and 26 were made with Tackidex® 133 stabilizer (0.8% and 0.6% respectively); the other examples were made with Tackidex® 035 (0.6%). The composition and IV of the polymers are shown in Table 5.

TABLE 5

Bead-type Suspension Polymerization of Various Monomers in the Presence of Dextrin

| Ex. No. | Monomers | % Solids | % ABP | % IOTG | % STS | IV |
|---|---|---|---|---|---|---|
| 25 | IOA/MAA 99/1 | 45 | 0.4 | 0.022 | 0.6 | 1.48 |
| 26 | IOA/MAA 94/6 | 45 | 0 | 0.03 | 0 | 1.01 |
| 27 | IOA/MA/AA 70/15/15 | 35 | 0 | 0.03 | 0.2 | |
| 28 | IOA/AA 90/10 | 35 | 0 | 0.02 | 0.2 | 1.3 |
| 29 | IOA/iBA/MAA 92/6/2 | 40 | 0 | 0.017 | 0.2 | 1.5 |
| 30 | 2-EHA/MAA 98/2 | 45 | 0.2 | 0.02 | 0.2 | |
| 31 | IOA/MA/Styrene 95/2/3 | 45 | 0.4 | 0.022 | 0.2 | 0.84 |
| 32 | IOA/MAA 98/2 | 45 | 0.2 | 0.014 | 0.2 | 1.72 |
| 33 | IOA/MAA 98/2 | 45 | 0.2 | 0.03 | 0.2 | 1.1 |

The results indicate that it is possible to make stable, free flowing suspension beads from a variety of monomers, as well as from compositions comprising a high level of strongly polar comonomers. The suspension polymerization in accordance with the present invention allows for the preparation of polymer beads comprising high levels (more than 20 parts) of polar monomers. The suspension polymer beads were stable for more than 4 weeks.

Examples 34 to 37

Examples 34 to 37 were made following the general procedure for the bead-type suspension polymerization as set out above. A monomer premix of phenoxyethylacrylate and isobornylacrylate in a molar ratio of 50/50 was prepared. 0.3% V-65 initiator was used. This premix was added to a mixture of 0.5% Tackidex® 035 and 0.5% of a polymeric stabilizer as indicated in table 6. Example 37 also contained 0.05% IOTG. The reactions were run at 35% solids. Comparative example C-3 was run without polymeric costabilizer. Comparative examples C-4 and C-5 were run without the addition of Tackidex® 035.

TABLE 6

| Ex no | stabilizer | costabilizer | initiation temp | result |
|---|---|---|---|---|
| 34 | Tackidex ® 035 | PAA | 45 | free flowing beads* |
| 35 | Tackidex ® 035 | PAA | 50 | free flowing beads* |
| 36 | Tackidex ® 035 | PVP | 50 | free flowing beads* |
| 37 | Tackidex ® 035 | PVA | 50 | free flowing beads* |
| C-3 | Tackidex ® 035 | / | 50 | coagulation |
| C-4 | / | PAA | 50 | coagulation |
| C-5 | / | PVp | 50 | coagulation |

Note: *in wet state

As can be seen from the above table, a costabiliser is needed in case a monomer premix is used that does not include a polar monomer or polar macromer.

Example 38

Polymer beads were prepared using the general procedure for the bead-type suspension polymerization as set out above. A monomer premix of ethylacrylate/methylmethacrylate/isobornylacrylate/acrylic acid in a mol ratio 50/30/10/10 was used. 0.3% V-65 initiator was used. This premix was added to a mixture of 0.45% Tackidex® 035 and 0.13% of PVA The initiation temperature was 55° C. Stable beads were obtained. This example illustrates that a co-stabiliser may also be used in case the premix contains a polar monomer.

Example 39

Polymer beads were prepared using the general procedure for the bead-type suspension polymerization as set out above. The premix contained IOA/IBA/AA in a mol ratio 95/4.75/0.25 along with 0.1% ABP, 0.02% IOTG and 0.3% V-65 initiator. The stabiliser system consisted of 0.6% Tackidex® 035 and 0.6% of PVA. The initiation temperature was 45° C. Stable beads were obtained.

Examples 40 to 46

Examples 40 to 46 were made following the general procedure for the bead-type suspension polymerization with a monomer mixture as given in table 7. In all cases 0.6% Tackidex® 035 was used as stabilizer. 0.3% V-65 initiator was used and initiation temperature was 50° C.

TABLE 7

| Ex No | Composition | % SSS | Chain transfer Oil Phase IOTG | Chain transfer Water Phase PETP | result |
|---|---|---|---|---|---|
| 40 | BA/AA 80/20 | | 0.03 | | OK |
| 41 | BA/AA/MAA 80/10/10 | | 0.05 | 0.05 | OK |
| 42 | BA/BCEA 80/20 | | 0.05 | 0.05 | OK |
| 43 | BA/AA/FUSOAM 90 g 80/10/10 | | 0.03 | | OK |
| 44 | BA/AA/FUSOAM 90 g 80/10/10 | 1 | 0.03 | | OK (1) |
| 45 | BA/AA/CW750AM 70/15/15 | | 0.03 | | OK |
| 46 | BA/BCEA/FUSOM 90 g 70/15/15 | 1 | 0.05 | 0.05 | OK |
| 47a | BA/BCEA/(EO)2EA 70/15/15 | | 0.05 | 0.05 | Coagulated |
| 47b | BA/BCEA/(EO)2EA 70/15/15 | 1 | 0.05 | 0.05 | OK (1) |

Notes: OK means that free flowing beads in a wet state were obtained; (1) examples 44, 47b compared to example 43, 47a: use of SSS (sodiumstyrenesulfonate) improves the stability of the reaction mixture. More homogeneous bead-size is obtained and the waterphase is completely water clear.

Notes: OK means that free flowing beads in a wet state were obtained; (1) examples 44, 47b compared to example 43, 47a: use of SSS (sodiumstyrene sulfonate) improves the stability of the reaction mixture. More homogeneous bead-size is obtained and the waterphase is completely water clear.

Examples 48 to 59

In Examples 48 to 59, suspension polymer beads were prepared essentially according to the general procedure, starting from IOA/MAA 96/4 and using 0.018% IOTG, 0.16% STS, 0.3% V-65, and 0.2% ABP. Tackidex® 035 was used as stabilizer. Suspension polymer beads with an IV of 1.6 were obtained. After dewatering, the beads were ex-truded at a temperature of 120° C.–180° C. (temperature increased from 120° C. to 180° C. in the extruder in the different zones). As indicated in Table 8, the suspension polymer beads were in some cases formulated with tackifying agent during extrusion. The resulting adhesive formulations were coated onto a silicon-coated paper liner and laminated against a PET liner. The adhesives were tested before and after crosslinking under high intensity UV light. The results are given in Table 8.

TABLE 8

| Ex. No. | % Tackifier | Thickness (mm) | Curing (mJ/cm$^2$) | Adhesion to SS (N/dm) | Adhesion to Mel (N/dm) | RT Shear (min) | 70° C. Shear (min) |
|---|---|---|---|---|---|---|---|
| 48 | / | 0.05 | / | 38 | / | 21 sp | 2 sp |
| 49 | / | 0.05 | 5 | 37 | 41 | 8000 po | 3500 po |
| 50 | 30% Foral 85 | 0.05 | / | 49 | 38 | 29 sp | 2 sp |
| 51 | 30% Foral 85 | 0.05 | 15 | 42 | 40 | 1800 po | 1200 po |
| 52 | 40% SP 553 | 0.05 | / | 74 | 65 | 101 sp | 3 sp |

TABLE 8-continued

| Ex. No. | % Tackifier | Thickness (mm) | Curing (mJ/cm$^2$) | Adhesion to SS (N/dm) | Adhesion to Mel (N/dm) | RT Shear (min) | 70° C. Shear (min) |
|---|---|---|---|---|---|---|---|
| 53 | 40% SP 553 | 0.05 | 240 | 74 | 58 | 3500 po | 8700 po |
| 54 | 50% SP 553 | 0.08 | / | 88 | 73 | | 3 sp |
| 55 | 50% SP 553 | 0.08 | 280 | 109 | 84 | 10000+ | 10000+ |
| 56 | 35% SP 553 + 15% Regalrez ® 6108 | 0.08 | / | 74 | 65 | 162 sp | 3 sp |
| 57 | 35% SP 553 + 15% Regalrez ® 6108 | 0.08 | 240 | 92 | 67 | 10000+ | 10000+ |
| 58 | / | 0.13 | / | 47 | | 17 sp | 2 sp |
| 59 | / | 0.13 | 5 | 44 | 40 | 2300 po | 10000+ |

Notes:
Adhesion to SS: 180° peel adhesion, measured at 300 mm/min
Adhesion to mel: 900 peel adhesion, measured at 300 mm/min
sp: split or cohesive failure; po: pop off or adhesive failure surprisingly, the suspension polymer beads with such a high inherent viscosity (IV=1.6) were easily extruded at low temperature (starting at 120° C.) without any difficulty. Adhesives with high overall performance were formulated.

were made by laminating the adhesive against both sides of a PVC or microvoided polypropylene (Teslin) liner. The thickness of the adhesive layer was 0.08 mm. The resulting adhesive properties are given in Table 9.

TABLE 9

Adhesive Properties of Double Coated Tapes Made with Extruded Suspension Polymers

| Ex. No. | % Tackifier | % XL | Curing (mJ/cm$^2$) | Adhesion to Mel PVC | Adhesion to Mel PP | RT Shear PVC | RT Shear PP |
|---|---|---|---|---|---|---|---|
| 60 | 45% SP 553 | 0.5 | 80 | 76 | 95 | 500 | 1200 |
| 61 | 45% SP 553 | 0.5 | 400 | 71 | 85 | 3000 | 1165 |
| 62 | 25% SP553 + 25% ARKON ® KE100 | 0.125 | 400 | 80 | 102 | 1500 | 2100 |
| 63 | 40% Regalrez ® | / | 120 | 69 | | 2350 | |
| 64 | 45% SP 553 | 0.15 | 200 | | 92 | | 4200 |
| 65 | 25% SP 553 + 25% ARKON ® KE100 | 0.125 | 400 | 84 | 100 | 2300 | 1200 |

Note: shear failure in all cases was adhesive failure

Examples 60 to 65

Examples 60 to 65, essentially the same procedure as in the previous Examples was repeated using other monomers and other tackifying agents.

Examples 60 to 63 were made essentially according to the above-described general procedure using IOA/MAA 98/2 monomer mixture, 0.017% IOTG, 0.16% STS, 0.3% V-65, and 0.2% ABP. The IV of the resulting polymer was 1.35. Examples 64 and 65 were made essentially the same way, but starting from a monomer mixture of IOA/iBA/MAA 92/6/2. The resulting IV was 1.5. The polymer beads were formulated with tackifying agent and in some cases with 2,4bistrichloromethyl-6(4-methoxyphenyl)s-triazine crosslinking agent (XL), during extrusion at a temperature of 120–180° C. The resulting adhesive formulations were coated onto silicon coated paper liner. Double coated tapes Again, it was observed that suspension polymers having a high inherent viscosity could be extruded at low temperature. The adhesive formulations prepared had high overall performance.

What is claimed is:

1. A method of suspension polymerization of (meth) acrylic monomers wherein a monomer premix comprising
   (i) at least one (meth)acrylic acid ester of at least one nontertiary alkyl alcohol, the alcohol having from 1 to 18 carbon atoms; and
   (ii) at least one free-radical initiator
is polymerized in an aqueous medium in the presence of at least one stabilizer selected from dextrins and dextrin derivatives; wherein at least one of (A) or (B) is true:
   (A) said monomer premix further comprises at least one polar monomer or polar macromer copolymerizable with the (meth)acrylic acid ester,
   (B) said aqueous medium further comprises a water soluble or water dispersible polymeric costabilizer.

2. A method according to claim 1 wherein said water soluble or water dispersible polymeric costabiliser is selected from the group consisting of a polyvinyl alcohol, a poly(meth)acrylic acid and a poly N-vinylpyrrolidone.

3. A method according to claim 1 wherein said polar macromer is represented by the formula I

X—Y—Z wherein X is a structural element comprising a moiety copolymerizable with the (meth)acrylic acid ester, Y is a divalent linking group, and Z comprises a water-dispersible or water-soluble oligomeric or polymeric moiety.

4. A method according to claim 1 wherein said stabiliser is a linear dextrin, a cyclic dextrin or a maltodextrin.

5. A method according to claim 1 wherein said stabilizer is used in an amount of 0.1 to 10% by weight based on the total amount of monomers and macromers.

6. A method according to claim 1 wherein said (meth) acrylic acid ester is selected from methyl (meth)acrylate, n-butyl (meth)acrylate, ethyl (meth)acrylate, 2-methylbutyl (meth)acrylate, isooctyl (meth)acrylate, 2-ethylhexyl (meth) acrylate, isononyl (meth)acrylate, decyl (meth)acrylate, dodecyl (meth)acrylate, hexyl (meth)acrylate, isobornyl (meth)acrylate, octadecyl (meth)acrylate, phenoxyethyl (meth)acrylate, and mixtures thereof.

7. A method according to claim 1 wherein said polar comonomer is selected from (meth)acrylic acid and salts thereof, (meth)acrylamide, and substituted (meth) acrylamides.

8. Polymer beads comprising a (meth)acrylic polymer of (i) at least one (meth)acrylic acid ester of at least one nontertiary alkyl alcohol, the alcohol having from 1 to 18 carbon atoms;

said polymer beads having on their surface a layer comprising at least one stabilizer selected from dextrins and dextrin derivatives and optionally a water soluble or water dispersible polymeric costabiliser.

9. Polymer beads according to claim 8 wherein said (meth)acrylic polymer is a copolymer of (i) at least one (meth)acrylic acid ester of at least one nontertiary alkyl alcohol, the alcohol having from 1 to 18 carbon atoms;

and (ii) at least one polar monomer or polar macromer copolymerizable with the (meth)acrylic acid ester.

10. Polymer beads according to claim 8 having a diameter of at least 50 μm.

11. An adhesive composition comprising the polymer beads of claim 8.

12. An adhesive composition according to claim 11 wherein said adhesive composition is a pressure sensitive adhesive composition.

13. A coated material comprising on a substrate the adhesive composition of claim 11.

* * * * *

UNITED STATES PATENT AND TRADEMARK OFFICE
CERTIFICATE OF CORRECTION

PATENT NO. : 6,245,838 B1
DATED : June 12, 2001
INVENTOR(S) : Yvan A. Bogaert, Eric B. Moonen, Robert R.L. Smolders, and Francois C. D'Haese It is certified that error appears in the above-identified patent and that said Letters Patent is hereby corrected as shown below:

Title page,
Inventors, "Yvan A. Bogaert, Ghent" should be -- Yvan A. Bogaert, Gent --; and "Francois C. D'Haese, Ghent" should be -- Francois C. D'Haese, Gent --

Column 4,
Line 13, "dextrins) such" should be -- dextrins such --

Column 7,
Line 47, ".adhesive" should be -- adhesive --

Column 9,
Line 52, "control The" should be -- control. The --

Column 10,
Line 20, "properties," should be -- properties. --
Line 43, Table 1 heading "Ex.." should be -- Ex. --
Line 44, Table 1 heading for column 4 of the Table "Weight %" should be -- Weight % IOTG --
Line 44, Table 1 heading for column 5 of the Table "Weight %" should be -- Weight % STS --

Column 12,
Line 40, Table 5, Example 27 "IOA/MA/AA 70/15/15" should be -- IOA/MAA/AA 70/15/15 --

Column 13,
Line 10, Table 6, Example C-5 "PVp" should be -- PVP --
Line 24, "0,45%" should be -- 0.45% --
Line 25, "PVA The" should be -- PVA. The --

Column 14,
Line 22, "(sodiumstyrenesulfonate)" should be -- (sodiumstyrene sulfonate) --
Line 27, delete second instance of "Notes:"
Line 47, "ex-truded" should be -- extruded --

UNITED STATES PATENT AND TRADEMARK OFFICE
CERTIFICATE OF CORRECTION

PATENT NO. : 6,245,838 B1
DATED : June 12, 2001
INVENTOR(S) : Yvan A. Bogaert, Eric B. Moonen, Robert R.L. Smolders, and Francois C. D'Haese It is certified that error appears in the above-identified patent and that said Letters Patent is hereby corrected as shown below:

Column 15,
Table 8-continued, Notes "Adhesion to mel: 900 peel" should be -- Adhesion to mel: 90 peel --
Line 23, "suprisingly," should be -- Surprisingly --

Signed and Sealed this

Second Day of April, 2002

Attest:

JAMES E. ROGAN
Attesting Officer  Director of the United States Patent and Trademark Office